United States Patent [19]
Miller

[11] 3,984,115
[45] Oct. 5, 1976

[54] CONVERTIBLE BABY CARRIER

[76] Inventor: Janice Miller, 1520 York Ave., New York, N.Y. 10028

[22] Filed: Aug. 18, 1975

[21] Appl. No.: 605,702

[52] U.S. Cl. .................................. 280/30; 224/9; 280/643; 297/130
[51] Int. Cl.² .......................................... B62B 7/12
[58] Field of Search ........... 280/642, 643, 648, 644, 280/647, 30; 224/9, 8 A; 297/130, 4

[56] References Cited
UNITED STATES PATENTS

| | | | |
|---|---|---|---|
| 2,770,488 | 11/1956 | Kuniholm et al. | 280/644 X |
| 2,822,117 | 2/1958 | Mack | 297/4 X |
| 2,836,334 | 5/1958 | Davis | 297/4 X |
| 2,843,185 | 7/1958 | Clem et al. | 224/9 X |
| 3,054,637 | 9/1962 | Pambello | 297/4 |
| 3,116,069 | 12/1963 | Dostal | 280/30 |
| 3,365,210 | 1/1968 | Patterson | 280/644 |
| 3,550,997 | 12/1970 | Strand | 224/9 X |
| 3,556,546 | 5/1969 | Garner | 280/644 |
| 3,610,489 | 10/1971 | Parsons | 224/9 X |
| 3,689,099 | 12/1968 | Patterson | 280/642 X |
| 3,692,323 | 10/1970 | Sekine | 280/644 |
| 3,713,568 | 11/1971 | Sloan | 297/4 X |
| 3,796,439 | 7/1972 | Perego | 280/644 |

FOREIGN PATENTS OR APPLICATIONS

| | | | |
|---|---|---|---|
| 1,282,368 | 12/1961 | France | 297/130 |

Primary Examiner—M. H. Wood, Jr.
Assistant Examiner—Jack D. Rubenstein
Attorney, Agent, or Firm—Allison C. Collard

[57] ABSTRACT

A baby carrier which can be converted into an infant's stroller comprising first and second tubular frame members which are bent to form a three-sided rectangular shaped opening in order to support a baby seat. The extending ends of the first and second tubular members are connected to articulated joints so that parallel spaced apart front and rear legs can be connected to the tubular members. At the ends of the legs are provided wheels so that when the legs are opened to their fully extended position, they form a stroller for the seat. One of the tubular members includes loops which are formed as handles at the rear portion of the seat. A shoulder strap is also provided as well as a back rest which spans between the ends of the tubular members adjacent to the articulated joints.

7 Claims, 2 Drawing Figures

U.S. Patent   Oct. 5, 1976   3,984,115
Fig. 1.
Fig. 2.
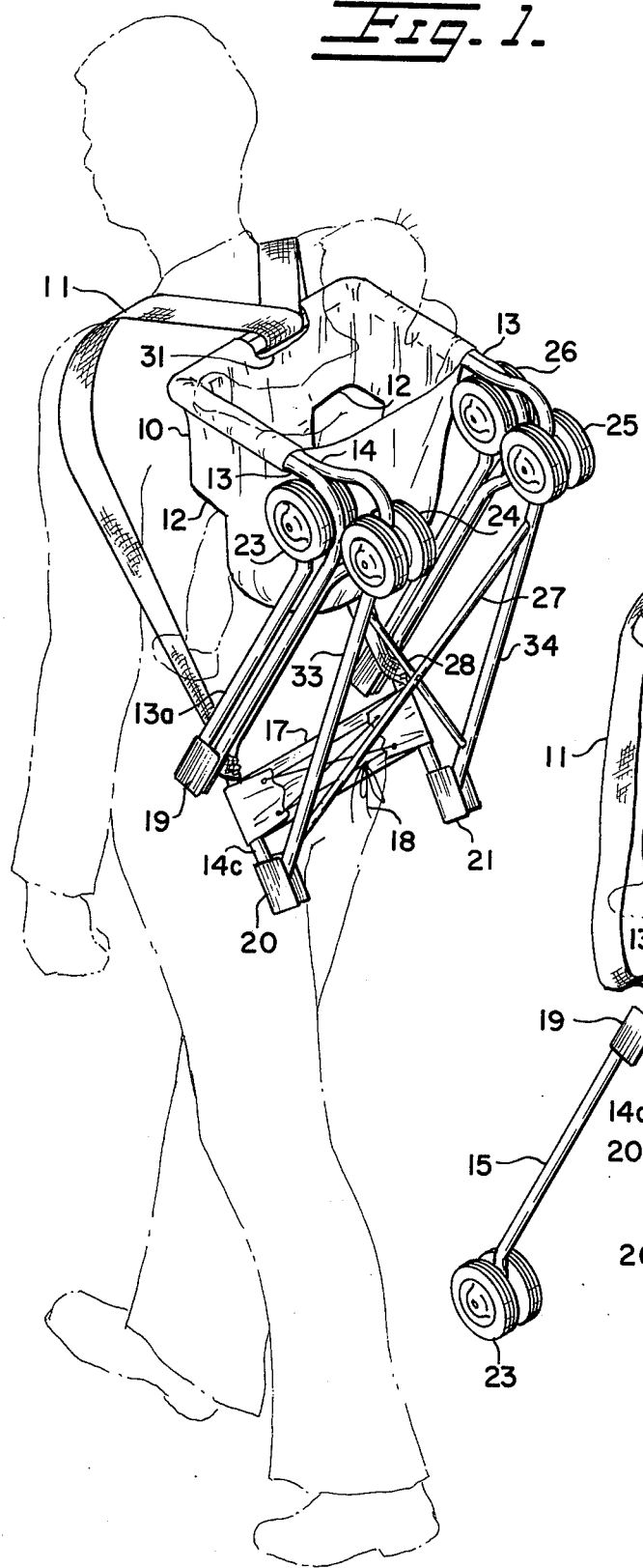
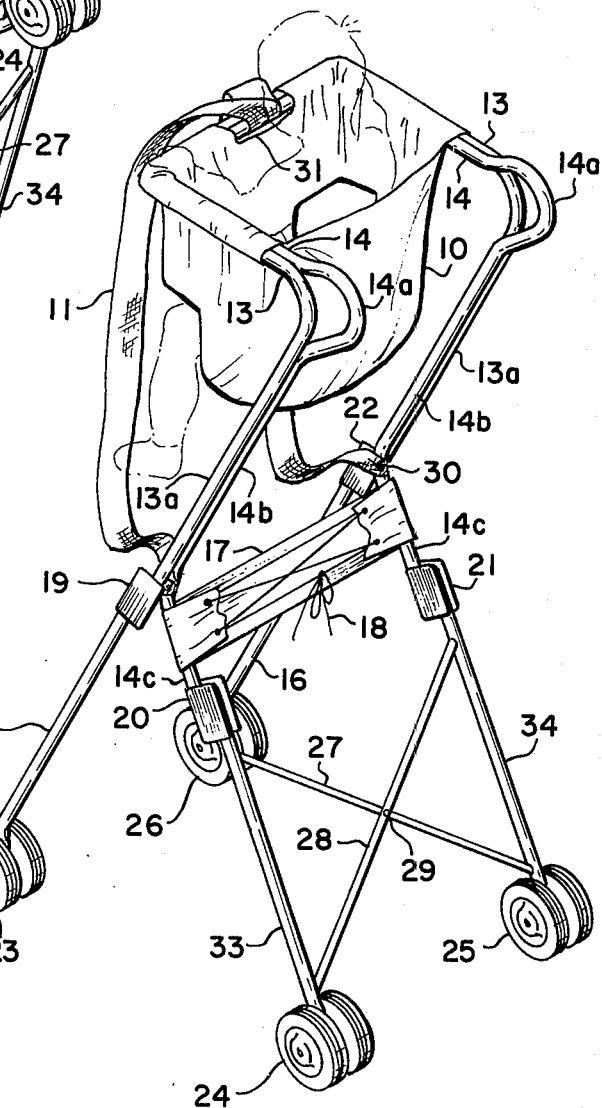

CONVERTIBLE BABY CARRIER

This invention relates to a convertible baby carrier which can be both carried on a person's back and independently suspended on a flat surface.

More specifically, this invention relates to a convertible baby carrier which includes a folding stand arrangement so that after it is removed from a person's back, a self contained folding stand can be erected to support the carrier and the child on a floor surface.

There are a plurality of conventional baby carriers presently being manufactured which consists of a canvas or soft cloth generally mounted on a rectangular frame and containing straps so that an infant can be carried on a person's back. The rectangular frame generally shapes the canvas portion of the carrier into a bucket which has two leg openings so that the feet of the child can extend forwardly with respect to the direction of motion of the person. One major disadvantage of these baby carriers is that the infant has to be removed from the carrier after the carrier is taken off the person's back since the carrier is not self-supporting nor provides any means for standing on a flat surface. This severely limits the use of the baby carrier since persons who travel long or short distances with the carrier must additionally provide a playpen or infant's seat after they remove the infant from the carrier.

Accordingly, the present invention overcomes the disadvantages of the conventional baby carriers by providing a stand having four legs which can be unfolded from the carrier so as to form an infant stroller. The stroller can then either be pushed along a flat surface or used as an infant's seat.

The apparatus provides wheels mounted on the ends of a stand and convenient handles to allow the user to push the seat as a stroller after the wheels have been erected.

It is therefore an object according to the present invention to provide a convertible baby carrier which can be used both to carry an infant on a person's back and as an infant stroller supported on four legs.

It is another object according to the invention to provide a convertible baby carrier which is simple in design, easy to manufacture, and reliable in operation.

Other objects and features of the present invention will become apparent from the following detailed description considered in connection with the accompanying drawing which discloses the embodiments of the invention. It is to be understood however that the drawing is designed for the purpose of illustration only and not as a definition of the limits of the invention.

In the drawing wherein similar reference characters denote similar elements throughout the two views:

FIG. 1 is a perspective slightly in elevation showing the baby carrier mounted to a person's back in its folded condition; and FIG. 2 shows the baby carrier in its unfolded position to be used as a baby stroller.

Referring to FIGS. 1 and 2 there is shown the convertible baby carrier consisting of a baby seat 10 preferably constructed of a canvas or nylon material. The top periphery of seat 10 is hemmed around a pair of parallel tubes 13 and 14 which rigidly support the seat in a rectangular shape. The seat includes leg openings 12 on the bottom front surfaces to accommodate the legs of an infant. The front edge of the seat also has a central opening 31 to permit a carrying should strap 11 be connected around tubes 13 and 14. Tube 14 which serves as the inside supporting tube is provided with hand grips 14a adjacent to the back portion of seat 10. Tube 14 includes side portions 14b which extend downwardly and are bent at an obtuse angle to form portions 14c. The ends of portions 14c terminate in articulated joints 20 and 21. These joints also connected to an X-frame consisting of leg portions 33 and 34 respectively, with cross braces 27 and 28. Cross braces 27 and 28 are preferably pinned at their intersection by means of pivot 29. Tubular legs 33 and 34 terminate in double wheels or casters, which are pivoted to the ends of these legs. It is obvious that single wheels or casters can be used but it has been found that double wheels give the greatest stability to the suspension, and provide a smoother ride.

The outside U-shaped frame portion 13 is bent downwardly to form straight portions 13a which run parallel to portions 14b of the innertube. The ends of portions 13a terminate in articulated joints 19 and 22 adjacent to the intersection of portions 14b and 14c. Connected to joints 19 and 22 are front leg supports consisting of tubes 15 and 16 which also terminate in double wheels 23 and 26.

Adjacent to articulated joints 19 and 22 and adjacent to the intersection of tube portions 14b and 14c are connection points 30 for the ends of strap 11.

Wrapped around tube portions 14c is a nylon or canvas back support 17 which is preferably laced in tension by means of string 18 so as to form a support and balancing surface against the lower portion of a person's back while the infant is being carried. In FIG. 2, the carrier is shown in its open position used as a stroller so that the infant can be pushed forwardly by a person gripping handles 14a.

The articulated joints 19–22 may be similar to those used with respect to conventional folding chairs, baby carriages etc. such as described in U.S. Pat. No. 3,390,893. Typically, these joints frictionally engage the ends of the tube so that when legs 15, 16, 33 and 34 are fully extended as shown in FIG. 2, the joints restrict any accidental folding of the legs by their frictional engagement or detents mounted in the joints. With a certain pressure applied by the user to the joint, the legs can be folded into the position shown in FIG. 1. The rear legs will fold upwardly toward handles 14a while the front legs are designed to fold forwardly and also nestle in front of the handles into the curved portion of tube 13.

Tubes 13 and 14 are preferably constructed of a light metal such as aluminum or magnesium and may be anodized or coated to prevent oxidation. The double wheels which are pivoted to the ends of the legs, are preferably constructed of soft rubber so as to provide a smooth ride for the occupant of the seat. As indicated earlier the seat, straps and backrest are preferably constructed of a woven canvas or nylon material. The seat is also designed sufficiently large so that infants up to one or two years old can be accommodated.

While only a few embodiments of the present invention have been shown and described, it will be obvious that many changes and modifications may be made thereunto without departing from the spirit and scope of the invention.

What is claimed is:

1. An infant carrier convertible from a back pack to a stroller comprising:

an infant seat of substantially rectangular shape having an upwardly facing opening and having openings in a lower portion for accomodating the legs of an infant;

a first rectangular shaped tubular frame member providing a first seat support along three sides of the seat adjacent the upwardly facing opening of the seat and having a pair of spaced apart downwardly extending support portions bent at an acute angle with respect to the rectangular portion;

a second rectangular shaped tubular frame member mounted substantially adjacent to and inwardly to said first tubular frame member and providing a second seat support along three sides of said seat adjacent the upwardly facing opening, said second tubular frame member having handles formed in the shape of loops at a rear portion of said seat and having downwardly extending supporting portions bent at an acute angle and parallel to the support portions of the first frame;

a plurality of articulated joints connected to the ends of said first and second frames; and a plurality of spaced apart legs connected to the articulated joints for supporting the seat in an upstanding position.

2. The carrier as recited in claim 1 wherein each of said legs additionally includes at least one wheel pivotably mounted at its end.

3. The carrier as recited in claim 2 wherein said legs comprise a pair of parallel spaced apart front legs connected through said articulated joints to the ends of said first tubular frame; and a pair of spaced-apart parallel legs connected through said articulated joints to the ends of said second tubular frame.

4. The carrier as recited in claim 3 wherein said back legs additionally comprise at least one cross brace interconnecting said legs.

5. The carrier as recited in claim 1 additionally comprising a back support disposed between the ends of said second tubular frame adjacent to said articulated joints.

6. The carrier as recited in claim 1 additionally comprising a shoulder strap having its center portion connected to said first and second tubular frames adjacent to said seat, and having its ends connected to the ends of said second tubular frame adjacent to said articulated joints.

7. The carrier as recited in claim 3 wherein said wheels comprise double rollers pivotably mounted on the end of each of said legs.

* * * * *